May 28, 1935.　　　J. A. HOFFMAN　　　2,003,194
HEAT ABSORBING DEVICE FOR THE PROTECTION OF STOKERS
Filed May 29, 1934　　　3 Sheets-Sheet 1

Inventor
Jerome A. Hoffman,

By
Attorney

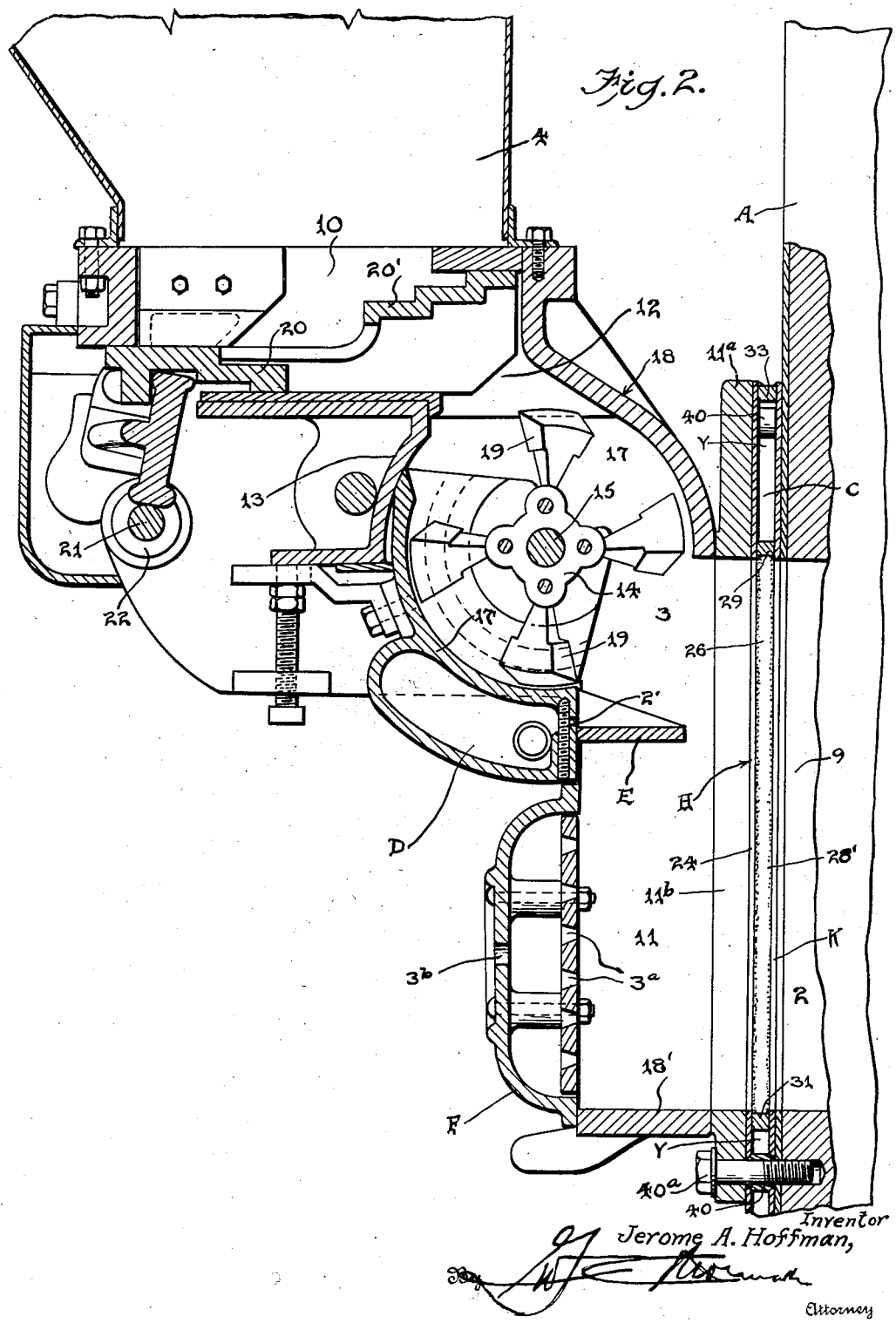

May 28, 1935. J. A. HOFFMAN 2,003,194
HEAT ABSORBING DEVICE FOR THE PROTECTION OF STOKERS
Filed May 29, 1934 3 Sheets-Sheet 3
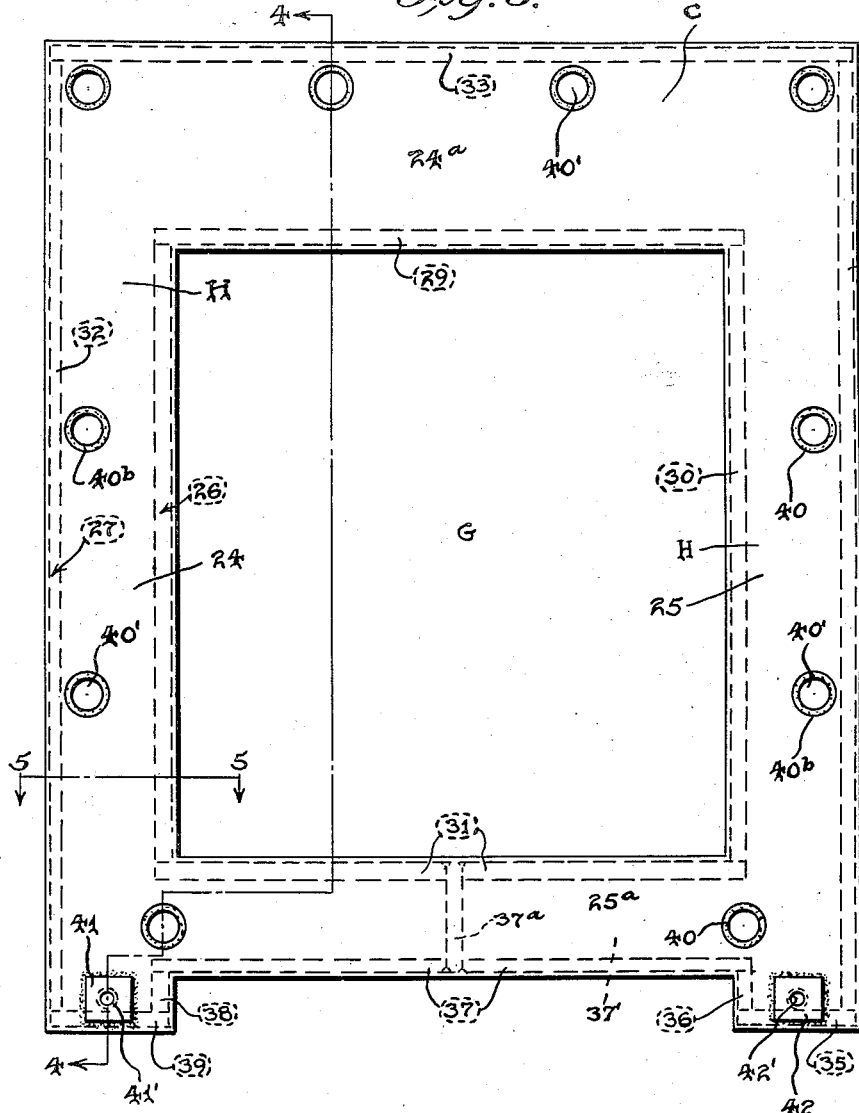
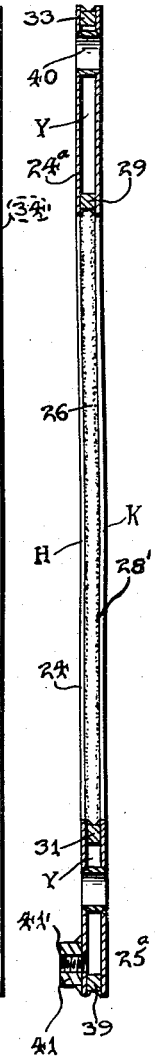
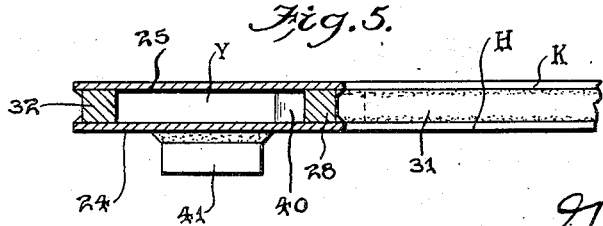
Inventor
Jerome A. Hoffman, Patented May 28, 1935

2,003,194

UNITED STATES PATENT OFFICE 2,003,194

HEAT ABSORBING DEVICE FOR THE PROTECTION OF STOKERS

Jerome A. Hoffman, Detroit, Mich., assignor to Hoffman Combustion Engineering Company, Detroit, Mich., a corporation of Michigan Application May 29, 1934, Serial No. 728,184

6 Claims. (Cl. 122—4)

This invention relates to a heat absorbing device for the protection of stokers.

One object of the invention is to provide a heat absorbing device for the protection of stokers from heat radiation constructed to be readily interposed between a furnace at the combustion chamber opening of the latter and a stoker at the fuel delivering opening of the latter to absorb heat of the combustion chamber to prevent injurious heat attack upon the stoker, particularly the distributing mechanism of the stoker, and parts adjacent thereto.

Another object of the invention resides in the provision of a hollow water-cooled member adapted to be interposed between the furnace and the stoker or formed as an integral part of the stoker construction to provide for the continuous circulation of water through the hollow member for the absorption of heat of the furnace and thereby protect the stoker and functioning parts thereof from detrimental attack by the intense heat of the combustion chamber of the furnace, the cool water circulating through said hollow member absorbing the heat of the combustion chamber and transferring it from between the furnace and the stoker and thereby protecting the latter against intense heat.

A still further object of the invention is to provide as an article of manufacture or as a permanent part of a stoker a water cooled heat absorbing device constructed of a relatively flat frame having a water chamber or channel therein for the continuous circulation of cool water for the purpose of absorbing heat of the furnace and to thereby prevent radiation of the heat of the furnace attacking the stoker mechanism.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Fig. 2 is an enlarged fragmentary vertical sectional view through a mechanical stoker and a boiler or furnace, and illustrating my invention between the stoker and the furnace and in vertical section.

Fig. 3 is a face or plan view of the invention.

Fig. 4 is a sectional view on the line 4—4 of Fig. 3.

Fig. 5 is a fragmentary sectional view on the line 5—5 of Fig. 3.

Figure 1:
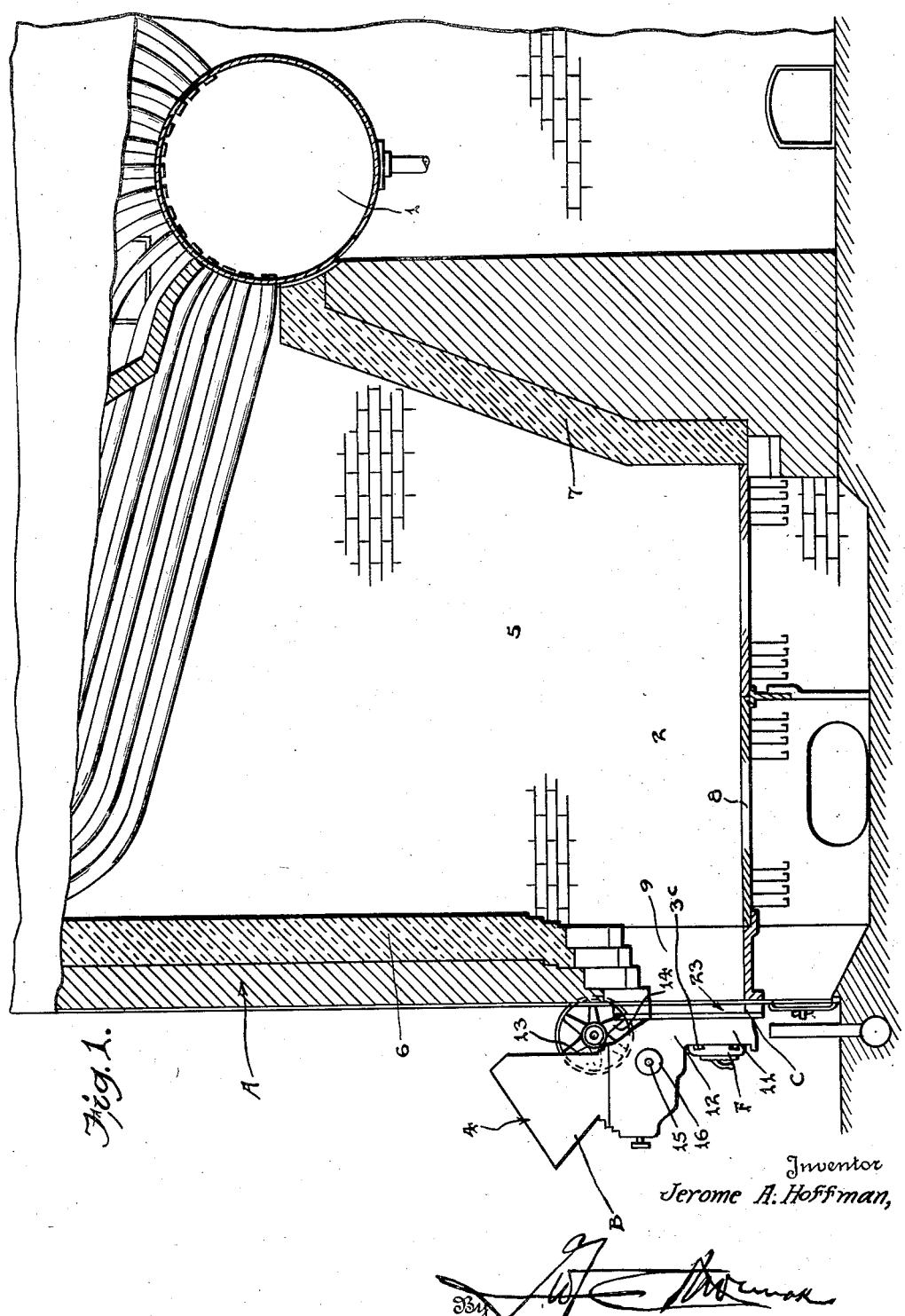
Figure 1 is a vertical sectional view of a boiler furnace and a stoker which latter is illustrated in side elevation, and illustrating the application of my invention between the boiler furnace and the stoker.

Referring now more particularly to the accompanying drawings, the reference character A indicates, generally, a boiler furnace including side walls 5, a front wall 6 and a rear or bridge 7, all of common construction, and providing the combustion chamber 2 adapted to be supplied with solid fuel by an automatic mechanical stoker of any suitable character through an opening 9 leading to the combustion chamber for heating the boiler 1.

The invention in this case does not go to the furnace or boiler nor to the particular type of stoker illustrated but rather to a water-cooled heat absorbing device C interposed between the furnace or boiler and the stoker to protect the latter from the intense heat of the furnace or boiler. Therefore, merely broad reference is made herein to various parts of the stoker and the boiler or furnace and brief reference will now be made to the stoker.

The stoker shown for purposes of illustration includes a hopper 4, a fuel receiving section 10 in which reciprocates a reciprocating feeding means 20—20'. The fuel receiving section 10 communicates by way of a throat 12 with a fuel distributing chamber section 17 in which a rotatable distributing element 14 is mounted and having blades 19 of any suitable character. The distributing element 14 is supported in any suitable manner on a rotatable shaft 15 for rotation under such speed or force as to effectively throw or pass the fuel through the throat 3 of the chamber 17 and through the fuel delivering section 11 to the combustion chamber 2 of the furnace or boiler. The distributing element 14 and the distributing chamber section 17, including the wall 17' and air chamber D does not form part of the present invention as regards this particular application and neither need be described in detail herein, nor is it necessary to describe in detail herein shelf E which projects from the air chamber into the fuel delivering section 11 to intercept and support particles of fuel which may fall by gravity in passage from the stoker to the furnace combustion chamber and swept therefrom by air issuing through the slot 2' from the air chamber D to the combustion chamber 2 to facilitate combustion and to form an air curtain or blanket to protect the distributing mechanism from the intense heat of the furnace or boiler as explained and claimed in another application for patent filed by me on even date herewith. The fuel delivering section 11 has a door F and provided with ventilating openings 3ª, 3ᵇ and 3ᶜ, described more in detail in the above noted other application.

The combustion which takes place within the combustion chamber 2 produces intense heat and such heat has a detrimental effect upon the stoker, sometimes burning out parts thereof, particularly parts of the distributing mechanism and parts adjacent thereto, reducing the efficiency of the stoker if not destroying parts thereof. It is, therefore, the main purpose of the present invention to prolong the usefulness and life of the stoker and to render a greater efficiency and greater plant capacity. It is for these reasons that I have provided the aforesaid water-cooled heat absorbing device C which is hollow and of any desired form and water-tight and through which water may be continuously circulated. This water-cooled heat absorbing device C is interposed between the front wall of the furnace or boiler and the rear of the fuel delivery section 11 of the stoker as illustrated particularly in Figs. 2 and 3 of the accompanying drawings. For instance, the fuel delivery section 11 includes a plate 11ª which is welded or otherwise secured firmly to the upper curved wall 18 of the distributing chamber and to the bottom wall 18' of the delivery section 11 and to the side walls thereof, and in this instance constitutes the rear wall of the stoker. This wall 11ª has an opening 11ᵇ corresponding in size and shape with the furnace front wall opening 9 and the opening G in the water cooled heat absorbing device C. It is between the wall 11ª of the fuel receiving section 11 and the front wall of the furnace that the heat absorbing member C is interposed and secured in place.

The water-cooled heat absorbing device or member C is preferably of metal and rectangular in shape, and having the aforesaid opening G. It is preferably composed of front and rear plates H and K of like formation formed to provide for said opening G and each including sides 24 and 25 connected by the top portion 24ª and the bottom portion 25ª. These plates H and K are spaced apart by means of inner and outer sets of metal strips to provide a water channel or chamber Y. For instance, the inner set of bars are designated by the reference characters 26, 29, 30 and 31 which are welded together and to the inner faces of the plates H and K around the rectangular opening G as shown by dots 28'. The outer set of metallic bars are indicated at 32, 33, 34, 35, 36, 37, 38 and 39 and they are welded together and to the inner faces of the plates H and K. The result of the form of plates H and K and the sets of spacing bars and the welding of such parts together is a rectangular device having the channel or chamber Y. Bolt holes 40' through the water-cooled heat absorbing member C may be provided by means of short sleeves or thimbles 40 which are welded to the front and rear plates H and K as indicated at 40ᵇ. By means of these bolt holes 40' the heat absorbing device C may be effectively secured to the front wall of the boiler or furnace by means of suitable bolts 40ª, as shown in Fig. 2, wherein it will be seen that the bolts 40ª pass through the fuel delivery wall 11ª and the thimbles 40 into the wall of the boiler or furnace. The heat absorbing device C may be secured in position in any other suitable manner and it may take shape other than the rectangular shape illustrated.

As shown in Fig. 3 the sides 24 and 25 of the water-cooled heat absorbing device depend below the lower portion 25ª and in these depending portions, or elsewhere, I insert pipe attaching devices 41 and 42, respectively, in the form of bosses, welded to the front plate and having screw-threaded sockets 41' and 42' whereby a pipe (not shown) can be connected for supply of water to the interior of the chamber at one side thereof and a pipe (not shown) whereby water may be taken from the chamber at the other side thereof. For instance, if the water under pressure enters the chamber at 41' it will circulate part way along the lower portion 25ª of the chamber to the partition 37ª and upwardly through the side 24 of the chamber and across the top thereof and down the side 25 and part way along the bottom 25ª to said partition 37' and out through the opening 42' in the boss 42 and the pipe connected thereto, providing for a continuous circulation of water. As the water becomes heated in passage through the water chamber of the heat absorbing device it passes off therefrom to permit the cool circulating water to effectively prevent damaging heat transfer to the stoker because of the absorption of the intensive heat by the continuous circulation of water through the water chamber. The circulating stream of water absorbs the heat and prevents exchange of intense heat from the boiler or furnace to the stoker, prolonging the life of the stoker and maintaining the efficiency thereof beyond the period where the stoker is ordinarily left to heat attack by reason of close proximity to the boiler or furnace and directly connected thereto. As explained in the other aforesaid application, the heat absorbing device C herein described may be employed in combination with the air under pressure from the air chamber D to further protect the stoker from the heat of the boiler or furnace and to facilitate effective combustion in the combustion chamber 2. In any event, it is essential to protect the stoker parts from intense heat, and I accomplish the purpose in some instances by the use of the heat absorbing device alone and in other instances by a curtain or blanket of air under pressure delivered from the air chamber C or by the use of both the heat absorbing device C and the supply of a blanket or curtain of air as may be deemed necessary or desired.

It will now be understood that the inflow of cool water and outflow of water with heat absorbed therein is continuously carried out with the result that device C cools or shields the functioning parts of the stoker from radiating heat of the furnace and by means of the water-cooled heat absorbing device C the functional parts of the distributing mechanism in particular can be maintained relatively cool even though an intense fire condition is maintained within the combustion chamber of the furnace in order to obtain high rating or high plant capacity.

It will be manifest also that this heat absorbing device C can be supplied as a separate article of manufacture or if desired it may have permanent connection with the wall 11ª of the delivering section of the stoker. It will also be manifest that the invention is not limited to the particular stoker construction but that it may be embodied in various forms of stoker constructions without departing from the spirit and scope of the invention, the essential feature being the supply of a continuous flow of cool water through a heat absorbing device arranged between the stoker and furnace and having a central opening therein corresponding to the fuel feeding opening of the furnace and through which fuel may be fed to the furnace, whereby the functioning parts of the stoker are maintained cool or relatively shielded from the intense heat of the combustion chamber or by conduction, radiation or convection.

It is also to be understood that the manner of producing or forming the water-cooling device may be varied from that herein described and illustrated so long as departure is not made from the appended claims.

What is claimed is:

1. The combination with a furnace and a stoker, of a water-cooled heat absorbing device interposed between the furnace and stoker to protect the latter from intense heat of the furnace comprising a relatively thin metallic frame having an opening surrounding the fuel feeding opening of the furnace and through which fuel to the furnace may be fed and provided with an open-ended water channel therein for the continuous passage of water therethrough to absorb heat radiation from the furnace.

2. The combination with a furnace and a stoker, of a water-cooled heat absorbing device interposed between the furnace and stoker to protect the latter from intense heat of the furnace comprising a metallic frame having an opening surrounding the fuel feeding opening of the furnace and through which fuel to the furnace may be fed and provided with an open-ended water passage therein for the continuous passage of water therethrough to absorb heat radiation from the furnace.

3. The combination with a furnace and a stoker, of a water-cooled heat absorbing device interposed between the furnace and stoker to protect the latter from intense heat of the furnace comprising a metallic frame having an opening surrounding the fuel feeding opening of the furnace and through which fuel to the furnace may be fed and provided with an open-ended water passage therein for the continuous passage of water therethrough to absorb heat radiation from the furnace, and means passing through an element of the stoker and through the frame and into the furnace wall whereby to secure same tightly together.

4. The combination with a furnace and a stoker, of a water-cooled heat absorbing device interposed between the furnace and stoker to protect the latter from intense heat of the furnace comprising a metallic frame having a central opening surrounding the fuel feeding opening of the furnace and through which fuel to the furnace may be fed and provided with an open-ended water passage therein for the continuous passage of water therethrough to absorb heat radiation from the furnace, and open-ended sleeves connecting the front and rear walls of the metallic frame and opening outwardly through the front and rear walls of the metallic frame, providing bolt holes for securing purposes.

5. The combination with a furnace and a stoker, of a water-cooled heat absorbing device interposed between the furnace and stoker to protect the latter from intense heat of the furnace comprising a metallic frame which embraces the fuel feeding opening of the furnace and through which fuel to the furnace may be fed and provided with a water channel for the continuous passage of water therethrough to absorb heat radiation from the furnace, said metallic frame having a water inlet and also having a water outlet, and means for securing the metallic frame in position between the furnace and the stoker.

6. A mechanical stoker including a casing having an opening therein for the discharge of fuel therefrom into a furnace, and a water-cooled heat absorbing device secured to the rear end of the stoker for the absorption of heat from a furnace when the stoker is associated with the latter and including a water chamber including an inlet opening and an outlet opening and provided with another opening to surround the fuel feeding opening of a furnace and through which said other opening and the fuel feeding opening of the furnace fuel may be fed into the furnace.

JEROME A. HOFFMAN.